United States Patent
Levin et al.

(10) Patent No.: US 10,693,899 B2
(45) Date of Patent: Jun. 23, 2020

(54) TRAFFIC ENFORCEMENT IN CONTAINERIZED ENVIRONMENTS

(71) Applicant: Twistlock, Ltd., Herzliya (IL)

(72) Inventors: Liron Levin, Herzliya (IL); Dima Stopel, Herzliya (IL); John Morello, Baton Rouge, LA (US); Eran Yanay, Modiin (IL)

(73) Assignee: TWISTLOCK, LTD., Herzliya (IL)

(*) Notice: Subject to any disclaimer, the term of this patent is extended or adjusted under 35 U.S.C. 154(b) by 0 days.

(21) Appl. No.: 16/166,781

(22) Filed: Oct. 22, 2018

(65) Prior Publication Data

US 2019/0058722 A1 Feb. 21, 2019

Related U.S. Application Data

(63) Continuation-in-part of application No. 15/991,528, filed on May 29, 2018, and a continuation-in-part of
(Continued)

(51) Int. Cl.
*H04L 29/06* (2006.01)
*H04L 9/32* (2006.01)
(Continued)

(52) U.S. Cl.
CPC ............ *H04L 63/1425* (2013.01); *G06F 8/60* (2013.01); *G06F 9/455* (2013.01); *G06F 21/53* (2013.01); *G06F 21/56* (2013.01); *G06F 21/577* (2013.01); *H04L 9/3247* (2013.01); *H04L 41/0803* (2013.01); *H04L 41/145* (2013.01); *H04L 43/028* (2013.01); *H04L 63/0227* (2013.01); *H04L 63/0263* (2013.01);
(Continued)

(58) Field of Classification Search
None
See application file for complete search history.

(56) References Cited

U.S. PATENT DOCUMENTS 6,490,620 B1 12/2002 Ditmer et al.
6,502,102 B1* 12/2002 Haswell ............ G06F 11/3664
(Continued)

OTHER PUBLICATIONS

Song, Sui; Manikopoulos, C.N. A Control Theoretical Approach for Flow Control to Mitigate Bandwidth Attacks. 2006 IEEE Information Assurance Workshop. https://ieeexplore.ieee.org/stamp/stamp.jsp?tp=&arnumber=1652116 (Year: 2006).*
(Continued)

*Primary Examiner* — Jeremiah L Avery
(74) *Attorney, Agent, or Firm* — M&B IP Analysts, LLC

(57) ABSTRACT

A system and method for traffic enforcement in containerized environments. The method includes analyzing contents of a container image to determine a type of application to be executed by a first container, wherein the first container is a runtime instance of the container image; determining, based on the type of application to be executed by the first container, a filtering profile for the first container, wherein the filtering profile defines a configuration for inspecting and filtering traffic directed to the first container; and filtering, based on the filtering profile, malicious traffic directed to the first container.

15 Claims, 6 Drawing Sheets

Related U.S. Application Data application No. 15/397,230, filed on Jan. 3, 2017, which is a continuation-in-part of application No. 15/278,700, filed on Sep. 28, 2016, and a continuation-in-part of application No. 15/292,915, filed on Oct. 13, 2016, now Pat. No. 10,223,534.

(60) Provisional application No. 62/576,288, filed on Oct. 24, 2017, provisional application No. 62/521,730, filed on Jun. 19, 2017, provisional application No. 62/274,420, filed on Jan. 4, 2016, provisional application No. 62/274,798, filed on Jan. 5, 2016, provisional application No. 62/235,644, filed on Oct. 1, 2015, provisional application No. 62/235,641, filed on Oct. 1, 2015, provisional application No. 62/241,812, filed on Oct. 15, 2015.

(51) Int. Cl.
*H04L 12/24* (2006.01)
*H04L 29/08* (2006.01)
*G06F 8/60* (2018.01)
*G06F 9/455* (2018.01)
*G06F 21/53* (2013.01)
*G06F 21/57* (2013.01)
*G06F 21/56* (2013.01)
*H04L 12/26* (2006.01)
*G06F 9/54* (2006.01)

(52) U.S. Cl.
CPC .......... *H04L 63/1441* (2013.01); *H04L 67/30* (2013.01); *H04L 67/34* (2013.01); *G06F 9/545* (2013.01); *G06F 2221/033* (2013.01)

(56) References Cited

U.S. PATENT DOCUMENTS

| | | | |
|---|---|---|---|
| 6,704,873 B1* | 3/2004 | Underwood | H04L 63/02 709/223 |
| 6,732,162 B1 | 5/2004 | Wood et al. | |
| 7,100,195 B1* | 8/2006 | Underwood | G06F 9/451 726/2 |
| 7,577,848 B2 | 8/2009 | Schwartz et al. | |
| 7,596,227 B2 | 9/2009 | Illowsky et al. | |
| 7,752,669 B2 | 7/2010 | Palliyil et al. | |
| 7,779,468 B1 | 8/2010 | Magdych et al. | |
| 8,302,192 B1 | 10/2012 | Cnudde et al. | |
| 8,316,237 B1 | 11/2012 | Felsher et al. | |
| 8,510,571 B1 | 8/2013 | Chang et al. | |
| 8,639,625 B1* | 1/2014 | Ginter | G06F 21/10 705/50 |
| 8,806,625 B1 | 8/2014 | Berger | |
| 8,966,629 B2 | 2/2015 | Sallam | |
| 9,003,141 B2* | 4/2015 | Nielsen | G06F 11/1438 711/162 |
| 9,098,333 B1 | 8/2015 | Obrecht et al. | |
| 9,256,467 B1 | 2/2016 | Singh et al. | |
| 9,355,248 B1 | 5/2016 | Wiest et al. | |
| 9,401,922 B1 | 7/2016 | Walters | |
| 9,928,379 B1* | 3/2018 | Hoffer | G06F 21/6245 |
| 10,223,534 B2 | 3/2019 | Stopel et al. | |
| 2001/0007131 A1 | 7/2001 | Galasso et al. | |
| 2003/0120593 A1* | 6/2003 | Bansal | G06Q 20/10 705/39 |
| 2005/0177715 A1 | 8/2005 | Somin et al. | |
| 2006/0230451 A1* | 10/2006 | Kramer | G06F 21/51 726/22 |
| 2006/0282664 A1 | 12/2006 | Zhao | |
| 2006/0288420 A1* | 12/2006 | Mantripragada | G06F 21/51 726/25 |
| 2007/0112714 A1* | 5/2007 | Fairweather | G06K 13/0825 706/46 |
| 2008/0168135 A1 | 7/2008 | Redlich et al. | |
| 2008/0177994 A1* | 7/2008 | Mayer | G06F 9/4418 713/2 |
| 2011/0116637 A1 | 5/2011 | Schiefelbein | |
| 2013/0073388 A1 | 3/2013 | Heath | |
| 2014/0059226 A1* | 2/2014 | Messerli | G06F 9/5072 709/226 |
| 2014/0237550 A1* | 8/2014 | Anderson | H04L 9/3213 726/3 |
| 2015/0156183 A1 | 6/2015 | Beyer et al. | |
| 2015/0220735 A1 | 8/2015 | Paithane et al. | |
| 2015/0271139 A1 | 9/2015 | Lukacs et al. | |
| 2015/0332043 A1 | 11/2015 | Russello | |
| 2015/0379287 A1 | 12/2015 | Mathur et al. | |
| 2017/0063557 A1 | 3/2017 | Chalmandrier-Perna | |
| 2017/0068676 A1* | 3/2017 | Jayachandran | G06F 16/125 |
| 2017/0244748 A1 | 8/2017 | Krause et al. | |

OTHER PUBLICATIONS

Van Niekerk, Brett; Jacobs, Pierre. Cloud-based Security Mechanisms for Critical Information Infrastructure Protection. 2013 International Conference on Adaptive Science and Technology. https://ieeexplore.ieee.org/stamp/stamp.jsp?tp=&arnumber=6707515 (Year: 2013).*

Guenane, Fouad Amine et al. Autonomous Architecture for Managing Firewalling Cloud-Based Service. 2014 International Conference and Workshop on the Network of the Future (NOF). https://ieeexplore.ieee.org/stamp/stamp.jsp?tp=&arnumber=7119774 (Year: 2014).*

Balazsi, Beata et al. Software System for Broadcasting and Monitoring Traffic Information. 2014 IEEE 12th International Symposium on Intelligent Systems and Informatics (SISY). https://ieeexplore.ieee.org/stamp/stamp.jsp?tp=&arnurnber=6923612 (Year: 2014).*

Jing, Nan et al. A Context-aware Disaster Response System Using Mobile Software Technologies and Collaborative Filtering Approach. 2014 IEEE 18th International Conference on Computer Supported Cooperative Work in Design. https://ieeexplore.ieee.org/stamp/stamp.jsp?tp=&arnumber=6846898 (Year: 2014).*

Kovatsch, et. al., "A RESTful Runtime Container for Scriptable Internet of Things Applications", 3rd IEEE International Conference on the Internet of Things, Oct. 2012.

Mattetti, et. al., "Securing the Infrastructure and the Workloads of Linux Containers", IEEE Conference on Communications and Network Security (CNS), 2015.

Pan, et. al., Robust Container Code Recognition System, Fifth World Congress on Intelligent Control and Automation, 2004.

Cooper, et. al., "Internet X.509 Public Key Infrastructure Certificate and Certificate Revocation List (CRL) Profile", May 2008, pp. 151.

Housley, et. al., "Internet X 509 Public Key Infrastructure Certificate and Certificate Revocation List (CRL) Profile", Apr. 2002, pp. 259.

Schneier, Bruce., "Economics of Information Security and Privacy III", 2013, pp. 73-109.

Cziva, et al., "Container-based Network Function Virtualization for Software-Defined Networks," 2015 IEEE Symposium on Computers and Communication (ISCC), pp. 415-420, Scotland.

Dhakchianandan, et al., "Memory Efficacious Pattern Matching Intrusion Detection System", 2013 International Conference on Recent Trends in Information Technology (ICRTIT), pp. 652-656, Anna University, Chennai, India.

Rehak, et al., "Adaptive Multiagent System for Network Traffic Monitoring," IEEE Intelligent Systems, vol. 24, Issue: 3, 2009, Czechia, pp. 17-25.

Shouman, et al., "Surviving Cyber Warfare With a Hybrid Multiagent-based Intrusion Prevention System," IEEE Potentials, vol. 29, Issue: 1, 2010, pp. 32-40.

Wang, et al., "Transport-Aware IP Routers: A Built-in Protection Mechanism to Counter DDoS Attacks," IEEE Transactions on Parallel and Distributed Systems, vol. 14, Issue: 9, pp. 873-884, Sep. 2003.

(56) References Cited

OTHER PUBLICATIONS

Zhauniarovich, et al., "MOSES: Supporting and Enforcing Security Profiles on Smartphones," IEEE Transactions on Dependable and Secure Computing, vol. 11, Issue: 3, pp. 211-223, 2014.

Azkia, et al., "Reconciling IHE-ATNA Profile with a posteriori Contextual Access and Usage Control Policy in Healthcare Environment", 2010 Sixth International Conference on Information Assurance and Security, 2010 IEEE, pp. 197-203, Cesson, Sevigne, France.

Skillen, et al., "Mobiflage: Deniable Storage Encryption for Mobile Devices," IEEE Transaction on Dependable and Secure Computing, vol. 11, No. 3, May-Jun. 2014, 2013 IEEE, pp. 224-237, Canada.

\* cited by examiner

TRAFFIC ENFORCEMENT IN CONTAINERIZED ENVIRONMENTS

CROSS-REFERENCE TO RELATED APPLICATIONS

This application claims the benefit of U.S. Provisional Application No. 62/576,288 filed on Oct. 24, 2017. This application is also a continuation-in-part (CIP) of U.S. patent application Ser. No. 15/991,528 filed on May 29, 2018, now pending, and U.S. patent application Ser. No. 15/397,230 filed on Jan. 3, 2017, now pending. The Ser. No. 15/991,528 application claims the benefit of U.S. Provisional Application No. 62/521,730 filed on Jun. 19, 2017. The Ser. No. 15/397,230 Application claims priority from U.S. Provisional Patent Application No. 62/274,420 filed on Jan. 4, 2016, and 62/274,798 filed on Jan. 5, 2016. The Ser. No. 15/397,230 Application is also a CIP of:

a) U.S. patent application Ser. No. 15/278,700 filed on Sep. 28, 2016, now pending, which claims priority from U.S. Provisional Patent Application No. 62/235,644 filed on Oct. 1, 2015, and 62/235,641 filed on Oct. 1, 2015; and b) U.S. patent application Ser. No. 15/292,915 filed on Oct. 13, 2016, now pending, which claims priority from U.S. Provisional Patent Application No. 62/241,812 filed on Oct. 15, 2015.

The contents of the above-referenced applications are hereby incorporated by reference.

TECHNICAL FIELD

The present disclosure generally relates to cybersecurity systems, and more particularly to traffic inspection and filtering in containerized environments.

BACKGROUND

A software container is an instance of a user-space running an application within the operating system (OS) of a host device (e.g., a server). Software containers enable operating-system-level virtualization in which the OS kernel allows the existence of multiple isolated software containers.

A software container (or a container) provides an executable environment with a complete filesystem. The filesystem may contain code, runtime, system tools, system libraries, and so on. That is, execution of a software container can be the same regardless of the underlying infrastructure. A Docker is one popular existing platform for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux kernel can be accessed directly using the libcontainer library or indirectly using the libvirt service.

As demonstrated in FIG. 1, a number of software containers (i.e., the app containers 110-1 through 110-n, hereinafter referred to individually as a container 110, merely for simplicity purposes) can access and share the same OS kernel 120. However, each container 110 can be constrained to only use a defined amount of hardware resources (e.g., CPU, memory, etc.) in the underlying hardware layer 130. Thus, using software containers, hardware resources can be isolated, services can be restricted, and processes can be provisioned to have an almost completely private view of the operating system with their own process ID space, file system structure, and network interfaces.

FIG. 2 illustrates a typical structure of a software container 200. The software container 200 includes a base image 210 and a container layer 220. The base image 210 includes one or more image layers 215-1 through 215-q (hereinafter referred to individually as a layer 215 and collectively as layers 215, merely for simplicity purposes). The layers 215 are read-only layers that represent filesystem differences. That is, the layers 215 are stacked on top of each other to form a base for the container's 200 root filesystem. The layers 215 are read only, and each layer 215 is identified by a randomly generated identifier number of a checksum computed using a hash function. All layers 215 and the base image 210 are collectively referred to as a "container image").

The base image 210 (and its layers 215) can be shared across different software containers. Thus, only the container layer 220 differentiates between one software container and another. The container layer 220 is a readable and writable layer where all data written to the software container 200 is saved in the container layer 220. When the software container 200 is deleted, the writable container layer 220 is also deleted, and the base image 210 remains unchanged. As such, the software container 200 and other software containers (not shown) can share access to the same base image 210, where each software container has its own data state. In the example demonstrated in FIG. 2, the software container 200 is a Docker container (e.g., compliant with the Docker platform).

The popularity of software containers has been increased due to the easy integration with cloud-computing platforms (e.g., Amazon® Web Services, Google® Cloud Platform, Microsoft® Azure, etc.). On such platforms, service providers can offer operating systems to run services and applications. With that said, the increasing reliance on software containers increases the need for secured execution.

Container images are typically uploaded and stored in image registries that may or may not be managed by an organization. Further, the base images are used across many container images. As such, base images can be developed and uploaded to image registries by programmers who are associated with the organization seeking to use the image. Therefore, hackers can take advantage of program images to include malicious code. Thus, such images can be vulnerable when integrated in a software container. Such malicious code may carry any type of malware including, for example, computer viruses, worms, Trojan horses, ransomware, spyware, adware, scareware, and the like. Further, such malicious code may be a source for an ATP attack or a distributed denial of service (DDoS) attack when a software container is executed with an infected or malicious image.

Networking between containers is typically accomplished through software defined networks that use multiple layers of abstraction and translation to send traffic between endpoints. Web applications in such environments are often deployed in random servers and accessed via random IP addresses.

To allow efficient protection of web applications executed in containers, the traffic flows between hosts hosting different containers should be inspected to enforce security rules. In the dynamic environment of containers, one way to implement such inspection is using a proxy for inspecting all traffic. However, such a solution is very intrusive since it requires implementing a proxy and installing an agent in each host for directing traffic to and from the proxy.

It would therefore be therefore advantageous to provide a solution that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for traffic enforcement in containerized environments. The method comprises: analyzing contents of a container image to determine a type of application to be executed by a first container, wherein the first container is a runtime instance of the container image; determining, based on the type of application to be executed by the first container, a filtering profile for the first container, wherein the filtering profile defines a configuration for inspecting and filtering traffic directed to the first container; and filtering, based on the filtering profile, malicious traffic directed to the first container.

Certain embodiments disclosed herein also include a non-transitory computer readable medium having stored thereon causing a processing circuitry to execute a process, the process comprising: analyzing contents of a container image to determine a type of application to be executed by a first container, wherein the first container is a runtime instance of the container image; determining, based on the type of application to be executed by the first container, a filtering profile for the first container, wherein the filtering profile defines a configuration for inspecting and filtering traffic directed to the first container; and filtering, based on the filtering profile, malicious traffic directed to the first container.

Certain embodiments disclosed herein also include a system for traffic enforcement in containerized environments. The system comprises: a processing circuitry; and a memory, the memory containing instructions that, when executed by the processing circuitry, configure the system to: analyze contents of a container image to determine a type of application to be executed by a first container, wherein the first container is a runtime instance of the container image; determine, based on the type of application to be executed by the first container, a filtering profile for the first container, wherein the filtering profile defines a configuration for inspecting and filtering traffic directed to the first container; and filter, based on the filtering profile, malicious traffic directed to the first container.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
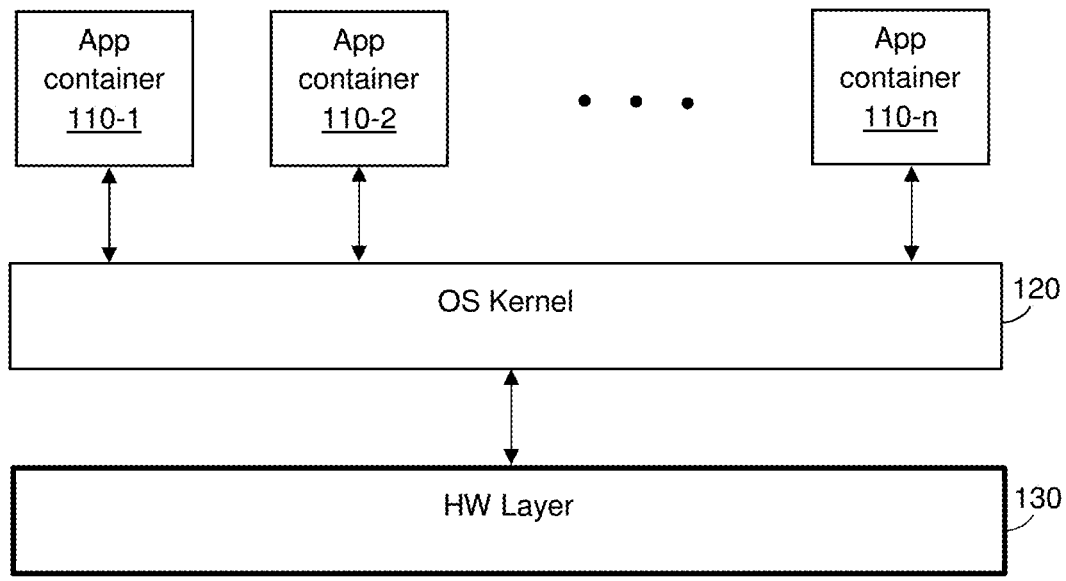
FIG. 1 is a diagram illustrating of execution of a plurality of software containers.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include techniques for enforcing traffic flows between containers without intrusion to the application flow. The traffic flows to be enforced may be achieved through one or more filtering rules as described further herein. The disclosed solutions allow application containers deployed in different hosts to communicate with each other securely without modifying the applications' flows. Traffic flows between application containers that do not comply with the filtering rules are blocked.

The disclosed embodiments provide increased security of communications among containers executed on different hosts. Further, enforcement of traffic flows between containers may allow, for example, implementation of an application firewall or proxy in a containerized environment. To this end, some embodiments further provide traffic manipulation that allows for communicating information needed for enforcement without modifying a SYN packet, thereby allowing traffic to pass unimpeded through any firewalls of proxies.

Figure 3:
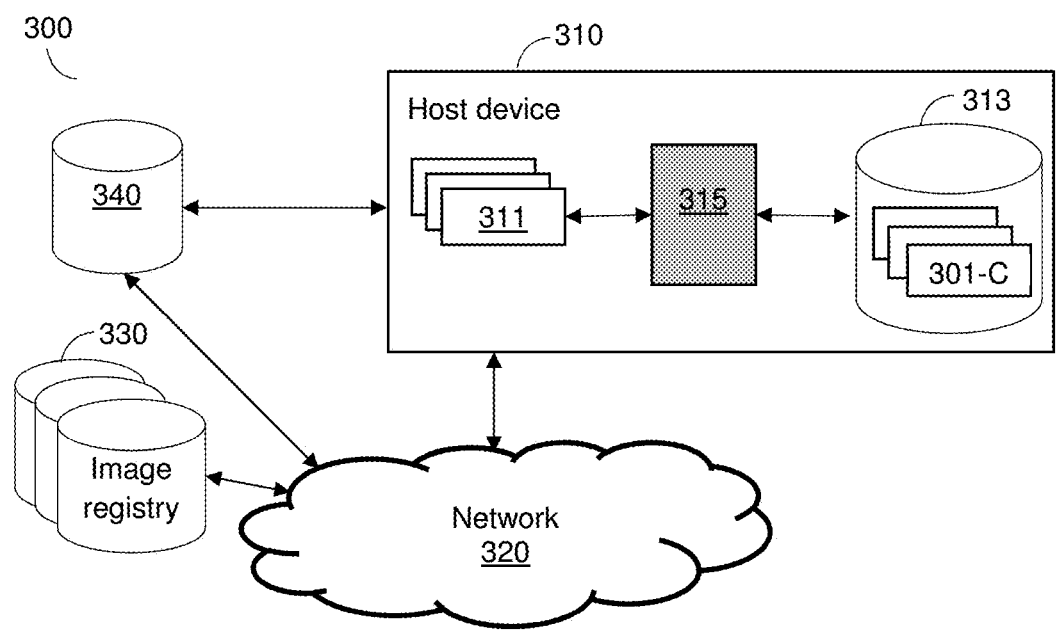
FIG. 3 is a network diagram utilized to describe the various disclosed embodiments.

FIG. 3 is an example network diagram 300 utilized to describe the various disclosed embodiments. A host device 310 is communicatively connected to a network 320. The host device 310 can be realized as a physical machine, a virtual machine, or a cloud infrastructure (IaaS). Examples for such a cloud infrastructure include, but are not limited to, Amazon Web Services (AWS), Cisco® Metapod, Microsoft Azure®, Google® Compute Engine (GCE), Joyent®, and the like. The host device 310 may be deployed in a datacenter, a cloud computing platform (e.g., a public cloud, a private cloud, or a hybrid cloud), on-premises of an organization, or in a combination thereof. The network 320 may be the Internet, the world-wide-web (WWW), a local area network (LAN), a wide area network (WAN), a metro area network (MAN), and other networks.

Figure 2:
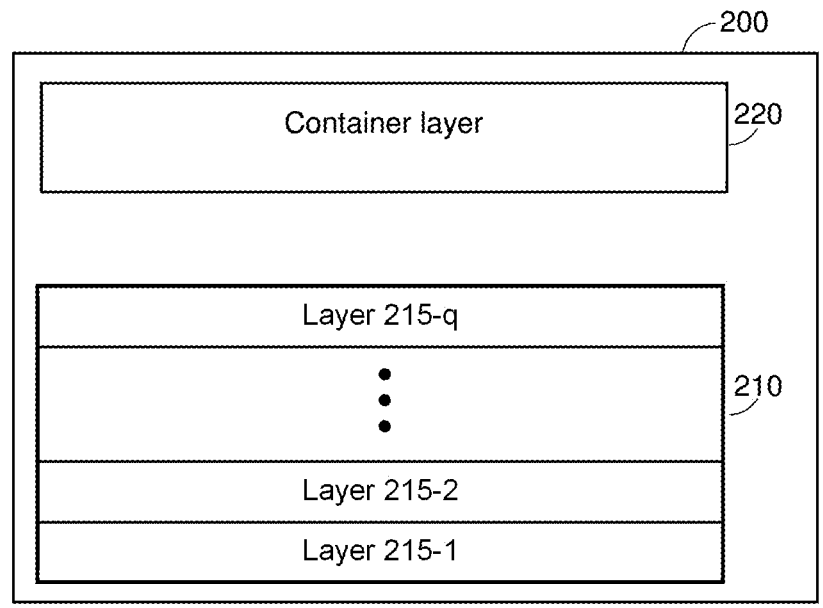
FIG. 2 is a diagram illustrating a structure of a software container.

Also communicatively connected to the network 320 is one or more image registries 330 (collectively referred to hereinafter as image registries 330 and individually as an image registry 330, merely for simplicity purposes). Each image registry 330 stores container images 301 that can be imported and executed on the host device 310 (container images 301 illustrated as stored in the host device 310 but not the image registry 330 merely for simplicity purposes). An example of such a container image is shown in FIG. 2. A container image 301 is a static file and a runtime instance of the container image 301 is a software container 311 executing a specific application (hereinafter "APP container" 311).

Each image registry 330 may be an image registry such as, but not limited to, Docker Hub, Google Container Registry, Amazon EC2 Container Registry, Artifactory, and the like. The image registry 330 is a data repository that allows programming and testing of container images. An image registry 330 typically provides a centralized resource for discovery, distribution, management, and collaboration of base images. An image registry 330 may be a cloud-based registry service or may be on-premises. In certain configurations, container images can be locally stored at the host device 310, e.g., in a registry 313. For example, a registry 313 includes a container image 301-C, where the runtime instance of this image is an APP container 311-C.

According to the disclosed embodiments, the host device 310 is configured to host and execute a defender container 315. The defender container 315 is a software container configured to inspect and filter traffic directed to protected APP containers of the APP containers 311. The defender container 315 is also configured to enforce traffic flow as discussed in greater detail below.

In an embodiment, the host device 310 (and the defender container 315) are configured to interface with a continuous integration (CI) system (not shown). Typically, a CI system allows for building, testing, and uploading of container images to the image registries 330. Examples for such a CI system include Jenkins®, Appveyor®, TeamCity, Bamboo, and the like. In an example embodiment, the interface between the host device 310 and the CI system may be realized as an API or a plugin. The host device 310 may also be communicatively connected to a database 340 storing generated filtering profiles and data utilized for determining application types based on container images.

In an embodiment, the defender container 315 is configured to receive all traffic from a protected APP container among the APP containers 311 directed to another app container (not shown) executed in a different host. The defender container 315 enforces a filtering profile based, in part, on information provided by another APP container 311. That is, the defender container 315 can act as a source for transmitting information for another APP container included in another host (not shown) or a destination for authenticating the connection based on the received metadata and the routing rules.

In such case, the defender container 315, when acting as a source, is configured to generate and send metadata to a destination defender container (not shown). The metadata includes, in part, information about the APP container trying to communicate with the destination APP container.

When the defender container 315, acting as a destination, allows or denies the connection request from a source APP container, based on the metadata and one or more routing rules. The various embodiments for generating and sending the metadata are discussed below.

The filtering rules can be generated by the defender container 315 either statically or dynamically. Various embodiments can be utilized to generate the filtering rules. In an embodiment, the defender container 315 is configured to statically analyze container images 301 of one or more protected APP containers to be deployed in the host device 310 to determine an application type of each application to be executed by the at least one protected APP container. Each protected APP container is one of the APP containers 311 executed by the host device that is to be protected using the filtering rules. The analysis may include comparing the analyzed container images 301 to a plurality of predetermined container images (not shown) associated with known application types stored in, e.g., the database 340.

Containers are immutable and there is a clear binding between images and containers, so it can be definitively determined which application is running in each container. Knowledge of the application executed in each APP container 311 allows the defender container 315 to determine whether an application layer filter is needed and, if so, which filtering profile should be used. Traffic can be dynamically rerouted through the defender container 315 without requiring any changes to the application itself or the deployment of the application. Because container images are immutable and deterministically unique, all model data for the container images, including model data that is automatically learned and model data that is statically discovered from images, can be aggregated across a cluster of containers by sharing data between nodes (i.e., containers). This aggregation allows for adapting filtering by each node to anomalies or other malicious behavior detected for other nodes. Specifically, cluster-wide learning can be used to further tune the models and to dynamically improve the models based on runtime events that occur across the cluster, images, containers, or the cluster's metadata. As an example, an anomalous event occurring with respect to a first APP container 311-1 can be used to trigger more restrictive filtering to be used on other APP containers 311-2 through 311-N, where N is an integer equal to or greater than 2.

In a further embodiment, the defender container 315 is configured to receive an event indicating that one or more of the container images 301 in the image registries 330 has been changed or added and to analyze each container image 301 that has been changed or added. The event includes at least a source of the added or changed container images 301 (e.g., a registry's network address or a check-in system) and an identifier of the container images 301 to be checked. In some implementations, the event may be generated by the host device 310 when a new base image is uploaded to the host or when an image locally stored in the host device 310 is modified. As discussed above, each container image 301 includes a container layer (e.g., the layer 210, FIG. 2) which sets the application executed by a container and a plurality of image layers (e.g., the layers 215, FIG. 2), each of which is uniquely identified. Each container image 301 may be assigned with a unique identifier, which may be computed as a check-sum or hash value computed over the contents of the layer.

In an embodiment, based on the analysis of the container images 301, the defender container 315 may be configured to create, for each protected APP container, a runtime model defining expected runtime behaviors of the protected APP container. The runtime models may be utilized at runtime to detect abnormalities in each protected APP container that is deployed. In a further embodiment, based on the detected abnormalities, the runtime models may be updated in real-time, thereby allowing for dynamic adaption of filtering based on newly identified abnormalities. The updating may be based on abnormalities identified with respect to all APP containers of the at least one protected APP container, thereby allowing for updating each runtime model based on abnormalities within the host device 310.

In an embodiment, based on the determined application types, the defender container 315 is configured to determine a filtering profile for each protected APP container. Each filtering profile defines rules for inspecting and filtering traffic directed to the corresponding protected APP container. The traffic inspection may include, but is not limited to, input validation using automatically inferred input types, API method validation, communication state monitoring, data leak prevention, malware detection, a combination thereof, and the like. The inspection and filtering may further differ based on particular features of different applications. As a non-limiting example, communication state monitoring between a frontend app and a database app may be different than communication state monitoring between two background apps.

Each filtering profile may further include the runtime model for the respective protected APP container. In a further embodiment, the filtering profile may further define rules for inspecting and filtering traffic based on abnormalities in traffic directed to the corresponding protected APP container or to any of the protected APP containers. As a non-limiting example, an abnormality detected based on traffic directed to a first APP container 311-1 may trigger more restrictive filtering on other APP containers 311-2 through 311-N, where N is an integer equal to or greater than 2.

In an embodiment, the defender container 315 is configured to monitor deployment of the protected APP containers 311 within the host device 310. The monitoring may include, but is not limited to, comparing runtime behavior of each APP container 311 executed in the host device 310 to the expected runtime behaviors defined in the runtime model for the protected APP container. Alternatively or collectively, the monitoring may include detecting a container identifier of each deployed APP container 311 and comparing the detected container identifiers to container identifiers associated with the protected APP containers (e.g., based on the unique identifiers of the container images 301).

In an embodiment, the monitoring may include determining whether each deployed APP container 311 is a protected APP container requiring traffic inspection and filtering, a type of each protected APP container, an inspection and filtering configuration for each protected APP container (e.g., as indicated in the filtering profile for the protected APP container), a combination thereof, and the like.

The defender container 315 is configured to generate at least one routing rule. The at least one routing rule defines redirection of traffic that is directed toward each protected APP container to the defender container 315. In an embodiment, the least one routing rule defines redirection of only a predefined portion of traffic flow (e.g., SYN) packets.

The defender container 315 is configured to inspect and filter the redirected traffic of each protected APP container at runtime based on the filtering rules for the respective protected APP container. As additional instances of the protected APP containers are deployed in the host device 310, additional routing rules may be generated in real-time, thereby dynamically adapting the inspection and filtering by the defender container 315 in real-time in response to changes in the host device 310.

In an embodiment, the defender container 315 is configured to inspect and filter encrypted traffic directed to the protected APP containers among the APP containers 311. In a further embodiment, the defender container 315 is further configured to interface with the protected APP containers and a host operating system (not shown) of the host device 310 to retrieve at least one key for decrypting traffic directed at the protected APP containers, and to seamlessly decrypt the encrypted traffic such that the encrypted traffic may be inspected by the defender container 315. The retrieved at least one key may be stored in the defender container 315 without persisting it to disk or moving it outside of the defender container 315, thereby allowing for deployment of containers without requiring provisioning of certificates on border devices.

In an embodiment, the defender container 315 is configured to train a machine learning model using the redirected traffic as inputs and filtering data as outputs, and is further configured to apply the machine learning model to dynamically adapt the filtering based on anomalous activity. In a further embodiment, the machine learning model may be adapted based on traffic redirected from other protected APP containers among the APP containers 311 such that abnormalities in any of the protected APP containers deployed in the host device 310 may trigger changes in filtering to be applied to each other protected APP containers deployed in the host device 310.

The machine learning model, in an embodiment, is applied to determine whether the connection from a source app container to a destination app container is allowed. In an embodiment, the machine learning model is trained with behavioral data related to protocols and traffic patterns. For example, the machine learning model may allow a connection based on the following example learning patterns: traffic received from multiple containers sharing the same image; traffic received during the startup time of an app container; and traffic received at reasonable rate.

The following example pattern would cause blocking of a connection request when traffic is received from processes executed by an APP container 311-1 that typically are not allowed to access the destination APP container 311-2. For example, a frontend process (node) typically communicates with a mongo process (node). The frontend is the source APP container 311-1, and the mongo process (backend) are in the destination APP container 311-2. However, if a new process (e.g., nc node) attempts to communicate with the mongo process at the destination APP container 311-2, such a connection attempt is blocked.

Figure 4:
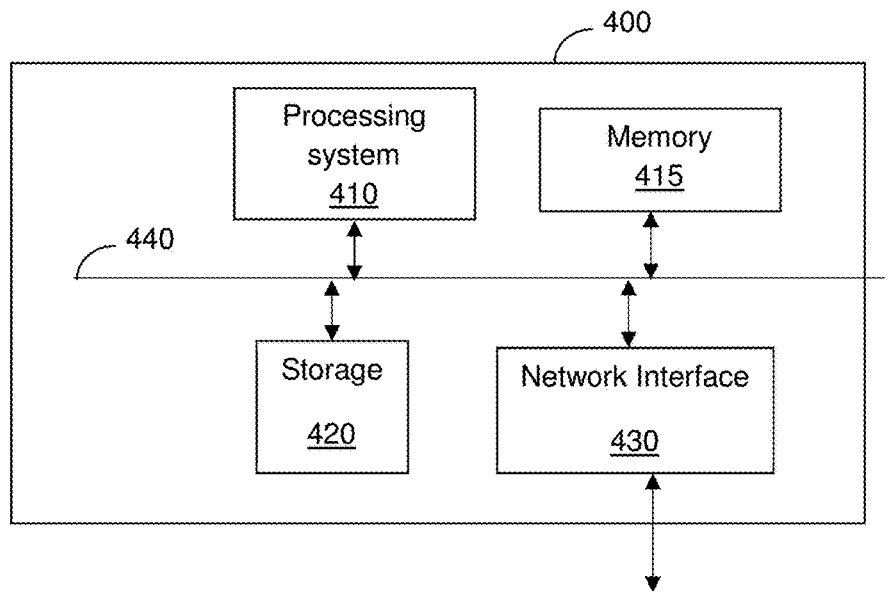
FIG. 4 is a block diagram of a hardware layer in a host device that may be utilized to execute at least a defender container according to an embodiment.

It should be appreciated that the host device requires an underlying hardware layer to execute the OS, VMs, and software (APP) containers. An example block diagram of a hardware layer 400 is shown in FIG. 4. The hardware layer 400 includes a processing circuitry 410, a memory 415, a storage 420, and a network interface 430, all connected to a computer bus 440.

The processing circuitry 410 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory may be volatile, non-volatile, or a combination thereof. The storage may be magnetic storage, optical storage, and the like.

In one configuration, computer readable instructions to implement one or more embodiments disclosed herein may be stored in the storage. The storage may also store other computer readable instructions to implement an operating system, an application program, and the like. Computer readable instructions may be loaded in the memory for execution by the processing circuitry 410.

In another embodiment, the storage 420, the memory 415, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various functions described herein with respect to at least profiling container images and enforcing secured execution of their respective APP containers based on the profiles.

The network interface 430 allows communication with other external systems or host devices through a network (e.g., the network 320). The network interface 430 may include a wired connection or a wireless connection. The network interface 430 may transmit communication media, receive communication media, or both. The computer bus 440 may be, for example, a PCIe bus.

Figure 5:
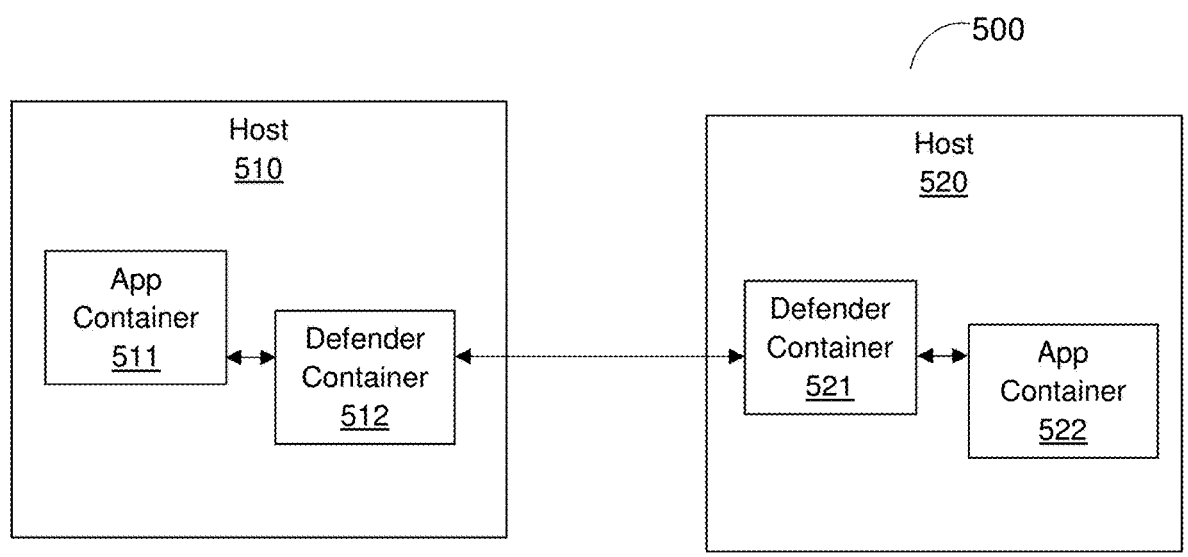
FIG. 5 is an example diagram illustrating communications among hosts for enforcing traffic flows between APP containers hosted in different hosts according to an embodiment.

FIG. 5 is an example diagram utilized to describe enforcement of traffic flows between APP containers hosted in different hosts according to some embodiments.

In the example diagram of FIG. 5, a host 510 hosts an APP container 511 and a defender container 512, and a host 520 hosts an APP container 522 and a defender container 521. In an example implementation, the APP container 511 is the source (hereinafter referred to as the "source APP container 511") and the APP container 522 is the destination (hereinafter referred to as the "destination APP container 522"). The hosts 510 and 520 communicate over a network (not shown).

Each APP container 511 and 522 is configured to use routing rules to direct all traffic to its local defender container 512 or 521, respectively. To this end, the defender container 512 (hereinafter the "source defender container 512") monitors the traffic from the source APP container 511. In an embodiment, when the source defender container 512 detects an attempt by the source APP container 511 to connect to the destination APP container 522, the source defender container 512 is configured to manipulate packets to hijack part of the TCP flow. For example, the source defender container 512 may hijack a TCP SYN packet. Alternatively, the source defender container 512 may utilize TCP option fields to set the source and state of the entity. An example implementation of this use of TCP option fields is described further herein with respect to FIG. 8.

The source defender container 512 is also configured to identify information related to the attempted connection. Such information may include, but is not limited to, an ID (or name) of a container sending the request (in this example, the source APP container 511), an ID (or name) of a process within the container sending the request, the destination of the request (in this example, the destination APP container 522), and other connection related parameters. Based on the identified information, the source defender container 512 is configured to create metadata encapsulating the identified information. The metadata is cryptographically signed.

The source defender container 512 is configured to modify the hijacked TCP packet to include the cryptographically-signed metadata. The modified TCP packet is sent to the host 520 (assuming it is the requested destination) over the network through a source port designed at the TCP connection request.

The modified TCP packet is received at the defender container 521 (hereinafter the destination defender container 521), which is configured to extract the metadata from the received packet. The destination defender container 521 is also configured to analyze the metadata to determine if the connection is allowed. As noted above, the determination is based, in part, on filtering rules. As an example, if the source APP container 511 is a frontend node and the destination APP container 522 is a mongo node, such a connection request may be allowed.

When a connection is allowed, the destination defender container 521 is configured to generate metadata based on the destination APP container 522. The metadata generated by the destination defender container 521 is cryptographically signed and sent to the source defender container 521 as an ACK TCP packet (e.g., TCP SYN-ACK). The source defender container 512, upon reception of the packet from the destination defender container 521, establishes a TCP connection with the host 520. This allows the APP containers 511 and 522 to communicate with each other. In an embodiment, the source defender container 512 may check if the destination complies with a set of filtering rules used according to a configuration of the source defender container 512.

In the above example, all modified TCP packets (e.g., SYN and SYN-ACK) are sent and received through the same port on each host 510 or 520.

It should be noted that the modified TCP packet can be interpreted only by a defender container 512 or 521 and, thus, any reception of such packet by a host without a defender container would result in an un-acknowledgment of the transmitted TCP packet.

In an embodiment, the traffic flows enforcement is performed by generating a ticket indicating that the destination would accept new connections. According to this embodiment, when the source defender container 512 detects an attempt by the source APP container 511 to connect to the destination APP container 522, the source defender container 512 is configured to hijack part of the TCP flow. For example, the source defender container 512 may hijack a TCP SYN packet. Based on the hijacked TCP packet, the source defender container 512 is configured to determine a source-destination IP and port number.

The source defender container 512 is configured to generate metadata including information on the source APP container 511 as discussed above. The generated metadata is cryptographically signed. In an embodiment, a message is created to include the cryptographically-signed metadata. The source defender container 512 is configured to send the metadata to the destination host 520 through a port that is different from the port designated in the TCP packet. As a non-limiting example, a port 501 (not shown) is the designated port, while a port 502 (not shown) is the port through which the message is sent to the destination host 520.

The message is received at the destination defender container 521, which is configured to extract the metadata and to determine if the connection is allowed. When a connection is allowed, the destination defender container 521 is configured to generate metadata about the destination APP container 522. The metadata generated by the destination defender container 521 is cryptographically signed. In an embodiment, the destination defender container 521 is configured to generate a ticket. The ticket may indicate if the connection is allowed or not. If the connection is allowed, the ticket would be valid for a predefined period of time. The cryptographically-signed metadata is transmitted in the ticket to the source defender container 512 via, for example, the port 502.

Based on the content of the ticket, the source defender container 512 is configured to determine if the TCP connection request should be allowed. If so, the hijacked TCP packet (e.g., SYN packet) is sent to the destination host 520 over the port designated in the packet (e.g., port 501). It should be noted that the TCP packet is relayed to the destination host 520 as received from the source APP container 511 (i.e., the packet is not modified). If the ticket is not valid, then the source defender container 512 would not allow the TCP connection.

It should be noted that the message can be interpreted only by the destination defender container 521, thus any reception of such packet by a host without a defender container would not result in generation of the ticket. In such a case, the source defender container 512 may be configured to relay the hijacked TCP package.

Figure 6:
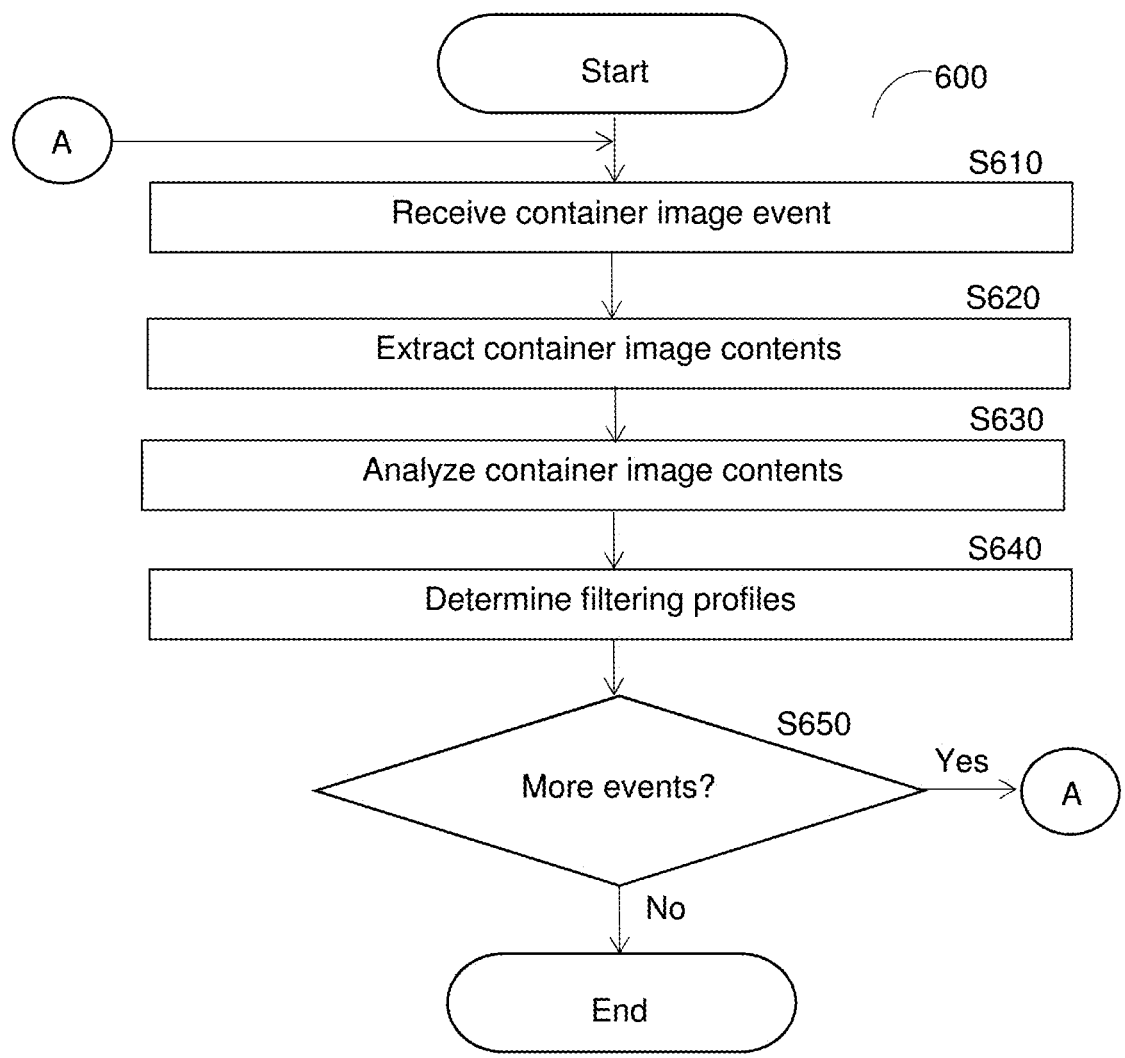
FIG. 6 is a flowchart illustrating a method for determining filtering profiles for dynamically adapted traffic inspection and filtering in a containerized environment according to an embodiment.

FIG. 6 shows an example flowchart 600 illustrating a method for determining filtering profiles for dynamically adapted traffic inspection and filtering in a containerized environment according to an embodiment.

At S610, at least one event indicating the addition or change of a container image in a containerized environment (e.g., the host device 310, FIG. 3) is received. In an embodiment, S610 includes receiving an indication that a new container is saved in the registries, an indication from a CI system (or orchestration tool), and the like.

At optional S620, the contents of the container images indicated in the received events are extracted. Specifically, the contents of each layer in each container image may be extracted. In an embodiment, the extraction includes reformatting the container image into a data structure that can be processed.

At S630, the contents of each container image are analyzed to determine a type of application to be executed by a container corresponding to the container image. In an embodiment, S630 includes analyzing the application layers of the container image to determine the type of application to be executed at runtime by the respective container.

In an embodiment, S630 further includes creating a runtime model for each analyzed container image. The runtime model defines expected runtime behavior of the container, thereby allowing for detection of anomalous behavior at runtime.

At S640, based on the analysis, a filtering profile is determined for each of at least one protected APP container. Each protected APP container is a runtime instance of one of the analyzed container images that is determined as requiring inspection and filtering. Each filtering profile defines a configuration for inspecting and filtering traffic directed toward the respective protected APP container. Each filtering profile may further include the corresponding runtime model for the respective protected APP container such that particular filtering configurations may be associated with certain runtime behaviors.

Each filtering profile may be saved in a central repository and utilized at runtime of the respective APP container to configure a defender container to filter traffic based on the configuration included in the respective container's filtering profile.

At S650, it is determined if additional events indicating new or changed container images have been received and, if so, execution continues with S610; otherwise, execution terminates. Accordingly, the method allows for dynamically adapting inspection and filtering by the defender container based on additions of and changes to container images. In some embodiments, after execution of the method of FIG. 6 terminates, execution of a method for runtime traffic inspection and filtering in a containerized environment (e.g., the method of FIG. 7) may start. Alternatively or collectively, the methods may be executed at least partially in parallel, thereby allowing for dynamic adaption both to new container images and to new deployments of containers.

Figure 7:
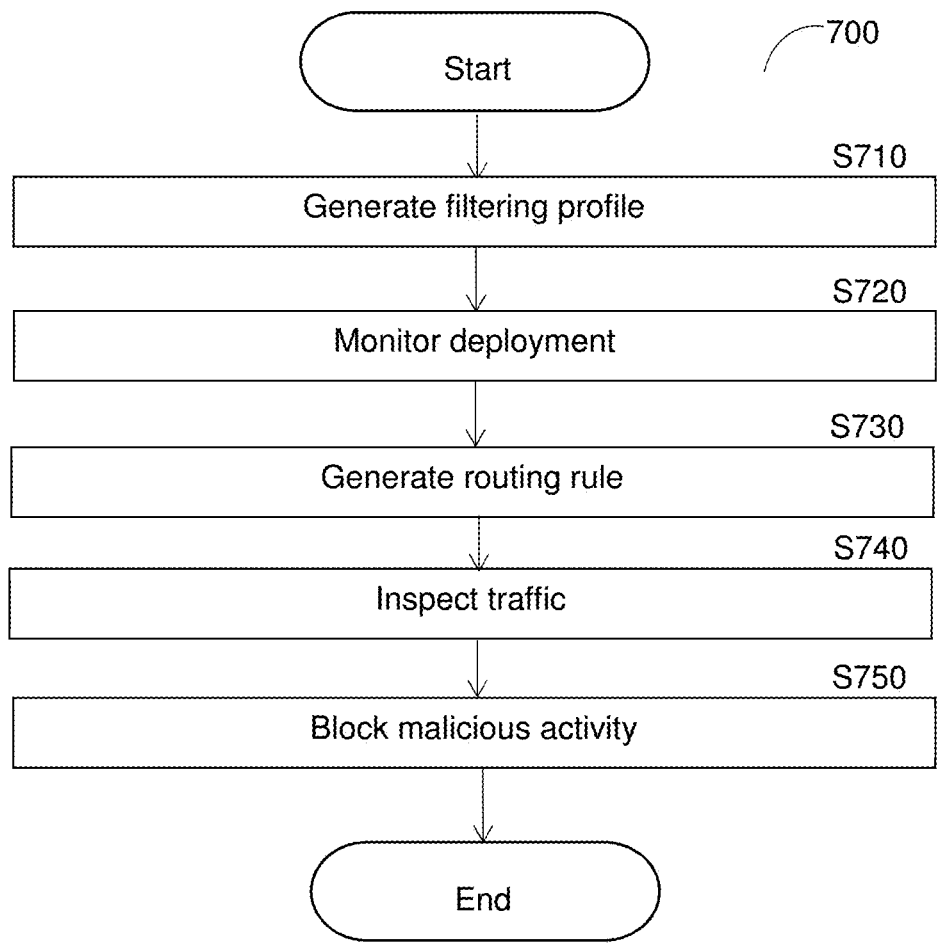
FIG. 7 is a flowchart illustrating a method for dynamically adapted traffic inspection and filtering in a containerized environment according to an embodiment.

FIG. 7 shows an example flowchart 700 illustrating a method for runtime traffic inspection and filtering in a containerized environment according to an embodiment. In an embodiment, the method is performed with respect to a protected APP container executed in a host (e.g., one of the APP containers 311 executed by the host 310, FIG. 3).

At S710, a filtering profile is generated for the protected APP container. The filtering profile may be generated as described herein above with respect to FIG. 6.

At S720, deployment of the protected APP container is monitored to detect when the at least one protected APP container is deployed. In an embodiment, S720 may include receiving events from an orchestration system. Such events may include the servers and network addresses allocated to the protected APP container.

At S730, on each host device hosting the protected APP container, a routing rule is generated. The routing rule is for causing redirection of traffic to a defender container. The defender container is also an APP container being executed on each host device hosting the protected APP container. In an embodiment, the defender container is configured to inspect and filter traffic redirected from each deployed protected APP container in accordance with the configuration defined in the filtering profile for the protected APP container.

Specifically, when traffic is sent from a source host to a destination host, a source defender container in the source host is configured to manipulate the traffic to add identifying information of the source. A destination defender container in the destination host is configured to check the manipulated traffic to determine whether a connection is allowed and, if so, to send a response for establishing the connection. Examples for establishing connections based on identifying information for entities are described further herein with respect to FIGS. 5 and 8.

At S740, traffic from the protected APP container is inspected, by the defender container, to detect any malicious activity. In an embodiment, the detection is performed based on the runtime model of the protected APP container (e.g., the runtime model created at S630, FIG. 6). It should be noted that the monitored traffic can be encrypted traffic. To this end, the defender container interfaces with the protected APP container and the server's operating system at runtime to securely retrieve key material from the protected APP container. Using the retrieved keys, the detector can terminate the encrypted connection and decrypt the traffic for inspection. This is performed without deploying additional certificates.

At S750, it is checked if any malicious activity has been detected. If so, such activity is blocked using one or more filtering rules design to block or present certain type of threats. These rules are part of the filtering profile. For example, filtering rules can be used to block SQL injection attacks and cross site scripting attacks.

Following is an example of the methods discussed above with respect to FIGS. 6 and 7. Events indicating new container images "customer/web" and "customer/database" in a server are received from an orchestration tool of the server. The contents of the container image are extracted and analyzed to determine that "customer/web" is a blog to be protected from cross site scripting attacks and that "customer/database" is a database application to be protected from SQL injection attacks. The server begins building a runtime model for "customer/web" and for "customer/database." The server further creates filtering profiles including filtering rules for protecting "customer/web" from cross site scripting attacks and for protecting "customer/database" from SQL injection attacks.

Deployment of APP containers is monitored. During the monitoring, "customer/web" is deployed on the server at a network address and an event indicating the network address of "customer/web" is received from a cluster orchestrator of the server. A routing rule is generated on the server. After generating the routing rule, the server begins redirecting traffic directed at "customer/web" to a defender container executed on the server. The redirected traffic is inspected by the defender container based on the runtime model of "customer/web" to detect malicious activity. When malicious activity indicating a cross site scripting attack is detected, the defender container is configured to use a filter for protecting against cross site scripting attacks.

As demand on the applications grows and "customer/web" and "customer/database" are deployed on more nodes by the orchestrator, additional routing rules are generated. Further, traffic redirected from the new instances of "customer/web" and "customer/database" are inspected and, as necessary, filtered, by the defender container. At no point does a user have to manually specify which applications run in which containers, which hosts those containers run on, or which filters should be applied to protect them.

For traffic that is encrypted, the defender container interfaces with the containers and a host operating system of the server at runtime to securely retrieve key material from "customer/web" and "customer/database" silently. The defender container terminates encrypted connections and inspects traffic of the previously encrypted connections without deploying additional certificates.

Figure 8:
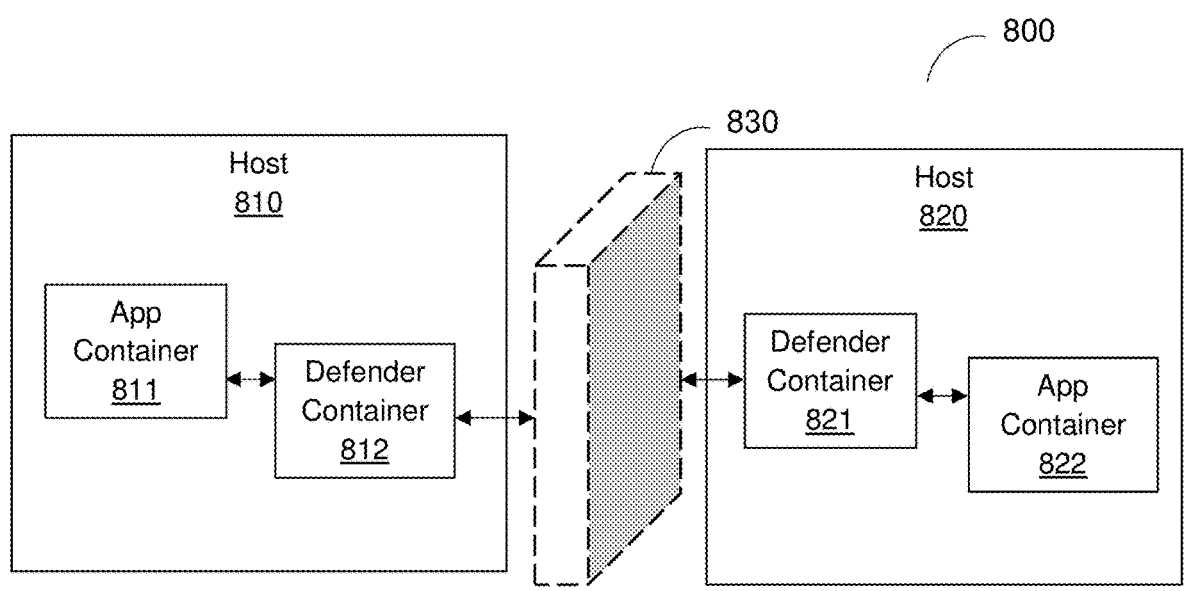
FIG. 8 is an example diagram illustrating communications among hosts utilized to describe various disclosed embodiments.

FIG. 8 is an example schematic diagram 800 utilized to describe various disclosed embodiments. In particular, FIG. 8 illustrates an embodiment where packets are manipulated by using TCP option fields to set sources and states of entities.

Directly manipulating the SYN packet may work in a local network but may be blocked by firewalls and proxies. Thus, the techniques described with respect to FIG. 8 may be utilized to bypass such firewalls or proxies when they are present between communicating host devices. In the example schematic diagram 800, a firewall 830 is deployed in line between host devices 810 and 820. The firewall 830 is configured to monitor and control traffic sent between the host devices 810 and 820.

In an example implementation, the host 810 and its containers 811 and 812 are source entities, and the host 820 and its containers 821 and 822 are destination entities. Each APP container 811 or 822 is configured to use routing rules to direct all traffic to its respective local defender container 812 or 821, respectively. To this end, the defender container 812 monitors traffic from the source APP container 811. In an embodiment, when the source defender container 812 detects an attempt by the source APP container 811 to connect to the destination APP container 822, the source defender container 812 is configured to control traffic flows by utilizing TCP option fields to set the source and state of the entity.

In an embodiment, the source defender container 812 is configured to add a unique distributed integer identifier to each entity in the network. To this end, the source defender container 812 is configured to request assignment of a unique integer ID from a global entity each time a new entity is created. The distributed integer identifier may be a short identifier that uniquely identifies each entity in the network. Each created entity is a container (i.e., one of the containers 811, 812, 821, or 821) or a host (e.g., the host 820).

The source defender container 812 is configured to sign each request and to add a special TCP header option to each request. The special TCP header option includes the assigned identifier for the requesting entity (e.g., the source APP container 811, the source host 810, or both) as well as state-indicating metadata (e.g., a learning state). Since the SYN packet is not modified, the firewall 830 (or any other firewalls or proxies, not shown) will not block the traffic.

The modified request is received at the defender container 821 is configured to detect the source entity and learning state using the TCP options includes in the request. The destination defender container 821 is also configured to analyze the metadata to determine if the connection is allowed. As noted above, the determination is based, in part, on filtering rules.

When the connection is allowed, the destination defender container 821 is configured to add a special TCP header option to a response packet and to send the modified response packet to the source defender container 821. The special TCP header option added by the destination defender container 821 includes the assigned identifier for the connecting entity (e.g., the destination APP container 822, the destination host 820, or both). The source defender container 812, upon receiving the packet from the destination defender container 821, is configured to establish a connection with the host 820, thereby allowing the APP containers 511 and 522 to communicate with each other. In an embodiment, the source defender container 812 may check if the destination complies with a set of filtering rules used according to a configuration of the source defender container 812.

It should be noted that a firewall is shown in FIG. 8 merely as an example, and that other configurations may be equally applicable. The techniques described with respect to FIG. 8 may be equally applicable to implementations including one or more firewalls, one or more proxies, or a combination thereof.

It should be noted that various embodiments have been discussed herein with a reference to software containers. A software container provides an executable environment with a complete filesystem. A software container may include a micro-service, a Docker container, a light virtual machine, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for traffic enforcement in containerized environments, comprising:
   analyzing contents of a container image to determine a type of application to be executed by a first container, wherein the first container is a runtime instance of the container image, wherein analyzing the contents of the container image further comprises creating a runtime model for the container image, wherein the runtime model defines expected runtime behaviors of the first container, wherein the filtering profile includes the created runtime model, wherein each configuration for inspecting and filtering traffic directed to the first container is associated with at least one of the expected runtime behaviors;
   determining, based on the type of application to be executed by the first container, a filtering profile for the first container, wherein the filtering profile defines at least one configuration for inspecting and filtering traffic directed to the first container; and
   filtering, based on the filtering profile, malicious traffic directed to the first container.

2. The method of claim 1, wherein the method is performed by a second container, wherein the first container and the second container are executed by a host device, further comprising:
   generating a routing rule; and
   configuring the first container based on the routing rule, wherein the first container is configured to redirect traffic to the second container when the first container is configured based on the routing rule.

3. The method of claim 2, further comprising:
   monitoring deployment of containers in a host device to detect deployment of the first container in the host device, wherein the routing rule is generated when deployment of the first container in the host device is detected.

4. The method of claim 1, further comprising:
   receiving a packet from a source entity, wherein the packet includes a request for connecting with the first container, wherein the packet is modified to indicate identifying information of the source entity; and
   identifying the source entity based on the modified packet; and
   detecting the received packet as being malicious traffic when a connection with the identified source entity is not allowed by the filtering profile.

5. The method of claim 4, wherein the received packet is a modified transmission control protocol (TCP) packet, wherein the modified TCP packet includes cryptographically-signed metadata indicating the identifying information of the source entity.

6. The method of claim 5, further comprising:
   generating metadata based on the first container;
   cryptographically signing the generated metadata; and
   generating a ticket, wherein the ticket includes the cryptographically-signed metadata and indicates whether the requested connection is allowed, wherein the source entity is configured to establish a TCP connection with the first container when the source entity receives the generated response and the requested connection is allowed.

7. The method of claim 4, wherein the received packet includes a transmission control protocol (TCP) header option, wherein the TCP header option includes an identifier assigned to the source entity, wherein the source entity is identified based on the identifier of the TCP protocol header option.

8. A non-transitory computer readable medium having stored thereon instructions for causing a processing circuitry to execute a process, the process comprising:
   analyzing contents of a container image to determine a type of application to be executed by a first container, wherein the first container is a runtime instance of the container image, wherein analyzing the contents of the container image further comprises creating a runtime model for the container image, wherein the runtime model defines expected runtime behaviors of the first container, wherein the filtering profile includes the created runtime model, wherein each configuration for inspecting and filtering traffic directed to the first container is associated with at least one of the expected runtime behaviors;
   determining, based on the type of application to be executed by the first container, a filtering profile for the first container, wherein the filtering profile defines at least one configuration for inspecting and filtering traffic directed to the first container; and filtering, based on the filtering profile, malicious traffic directed to the first container.

9. A system for traffic enforcement in containerized environments, comprising:
   a processing circuitry; and
   a memory, the memory containing instructions that, when executed by the processing circuitry, configure the system to:
   analyze contents of a container image to determine a type of application to be executed by a first container, wherein the first container is a runtime instance of the container image, wherein the system is further configured to create a runtime model for the container image, wherein the runtime model defines expected runtime behaviors of the first container, wherein the filtering profile includes the created runtime model, wherein each configuration for inspecting and filtering traffic directed to the first container is associated with at least one of the expected runtime behaviors;
   determine, based on the type of application to be executed by the first container, a filtering profile for the first container, wherein the filtering profile defines at least one configuration for inspecting and filtering traffic directed to the first container; and
   filter, based on the filtering profile, malicious traffic directed to the first container.

10. The system of claim 9, wherein the system is a host device executing the first container and a second container, wherein the system is further configured to:
    generate a routing rule; and
    configure the first container based on the routing rule, wherein the first container is configured to redirect traffic to the second container when the first container is configured based on the routing rule.

11. The system of claim 10, wherein the system is further configured to:
    monitor deployment of containers in a host device to detect deployment of the first container in the host device, wherein the routing rule is generated when deployment of the first container in the host device is detected.

12. The system of claim 9, wherein the system is further configured to:
    receive a packet from a source entity, wherein the packet includes a request for connecting with the first container, wherein the packet is modified to indicate identifying information of the source entity;
    identify the source entity based on the modified packet; and
    detect the received packet as being malicious traffic when a connection with the identified source entity is not allowed by the filtering profile.

13. The system of claim 12, wherein the received packet is a modified transmission control protocol (TCP) packet, wherein the modified TCP packet includes cryptographically-signed metadata indicating the identifying information of the source entity.

14. The system of claim 13, wherein the system is further configured to:
    generate metadata based on the first container;
    cryptographically sign the generated metadata; and
    generate a ticket, wherein the ticket includes the cryptographically-signed metadata and indicates whether the requested connection is allowed, wherein the source entity is configured to establish a TCP connection with the first container when the source entity receives the generated response and the requested connection is allowed.

15. The system of claim 12, wherein the received packet includes a transmission control protocol (TCP) header option, wherein the TCP header option includes an identifier assigned to the source entity, wherein the source entity is identified based on the identifier of the TCP protocol header option.

* * * * *